United States Patent [19]

Ikeda et al.

[11] Patent Number: 5,052,504

[45] Date of Patent: Oct. 1, 1991

[54] SALES DATA TRANSMISSION SYSTEM

[75] Inventors: Tetsuo Ikeda, Shiga; Hideo Nobutsugu, Kyoto, both of Japan

[73] Assignee: Ishida Scales Mfg. Co., Ltd., Shiga, Japan

[21] Appl. No.: 469,151

[22] Filed: Jan. 24, 1990

[30] Foreign Application Priority Data

Jan. 25, 1989 [JP] Japan ................................ 1-16684

[51] Int. Cl.$^5$ .................... G01G 19/40; G01G 23/18; G07G 1/12; G06F 15/20
[52] U.S. Cl. ................................ 177/25.15; 177/45; 364/405; 364/464.01
[58] Field of Search ............... 177/25.15, 45; 364/405, 364/464.01

[56] References Cited

U.S. PATENT DOCUMENTS 3,899,775  8/1975  Larsen .............................. 340/172.5
4,676,343  6/1987  Humble et al. ................... 177/50 X
4,879,650  11/1989  Kurimoto et al. .......... 177/25.15 X Primary Examiner—George H. Miller, Jr.
Attorney, Agent, or Firm—Heller, Ehrman, White, McAuliffe

[57] ABSTRACT

A sales data transmission system includes a sales data processor such as a scale of the type capable of calculating and displaying a sales price from a unit price and a measured weight, a communication device which is made a part of this data processor and transmits and receives signals indicative of sales data and a memory unit which serves not only to receive and store the sales data transmitted from the communication device but also to transmit the stored sales data back to the communication device in response to a request signal therefrom.

13 Claims, 5 Drawing Sheets

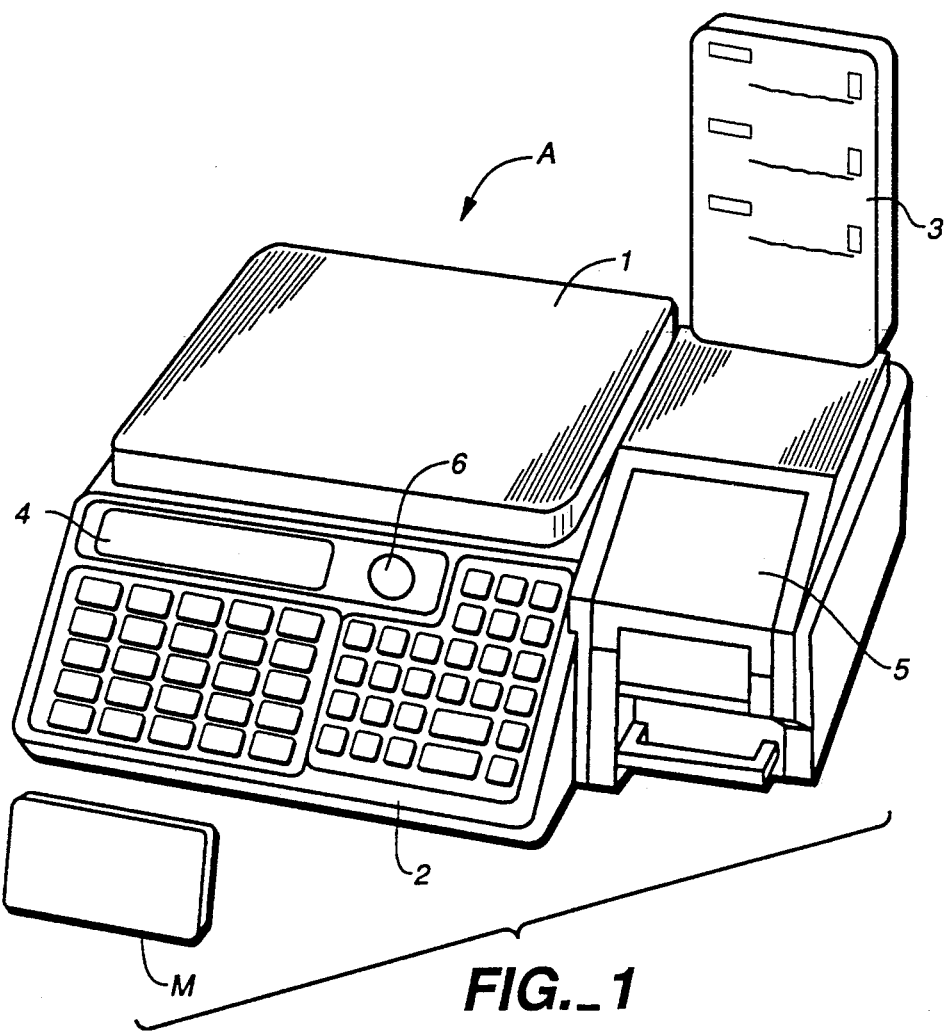
FIG._1
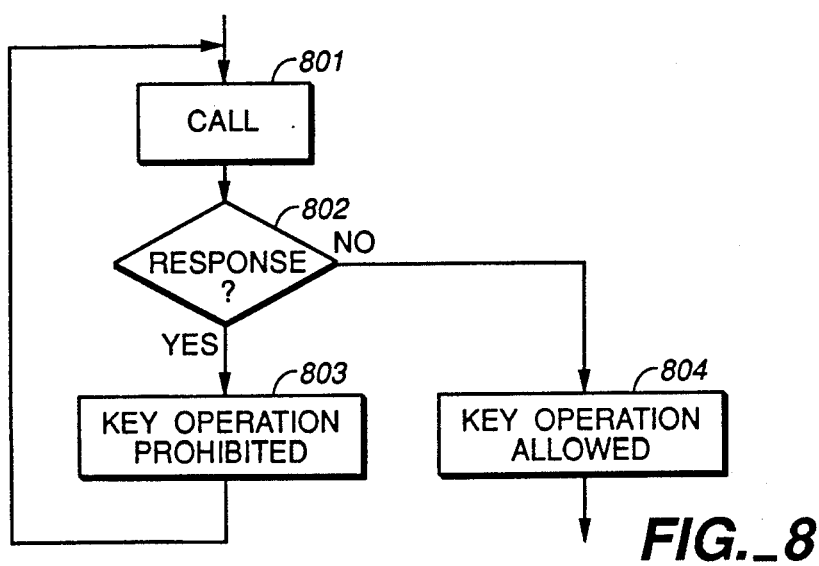
FIG._8

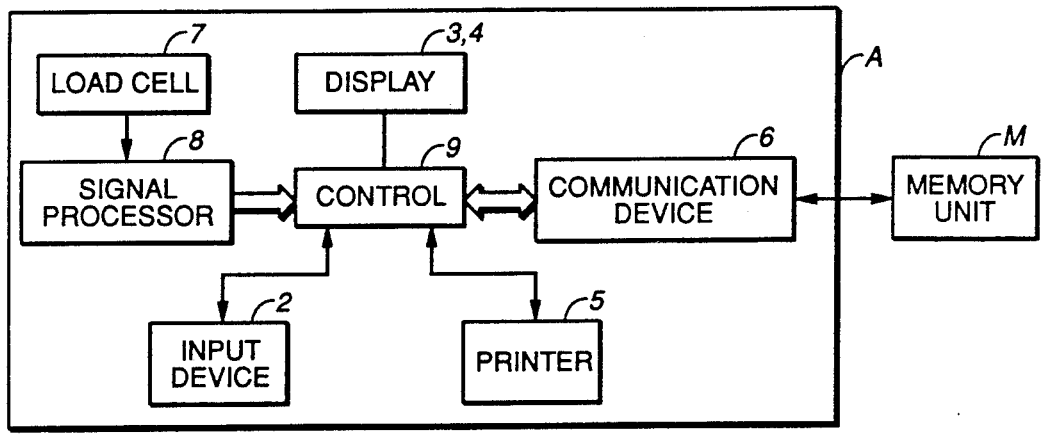
FIG._2
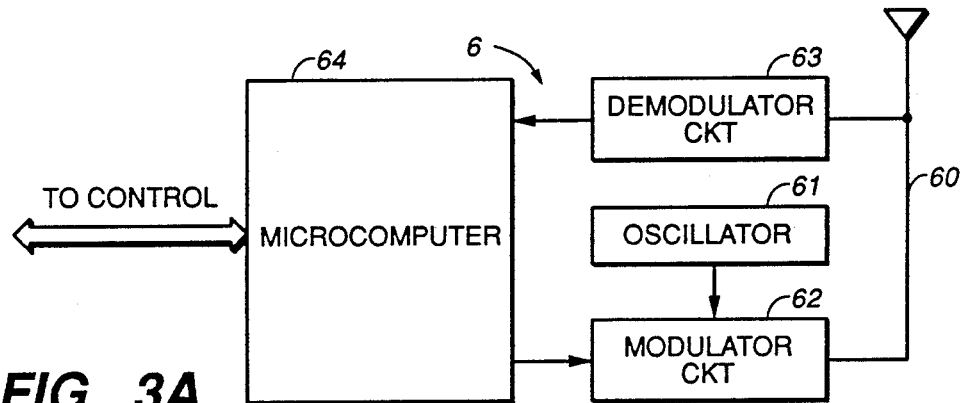
FIG._3A
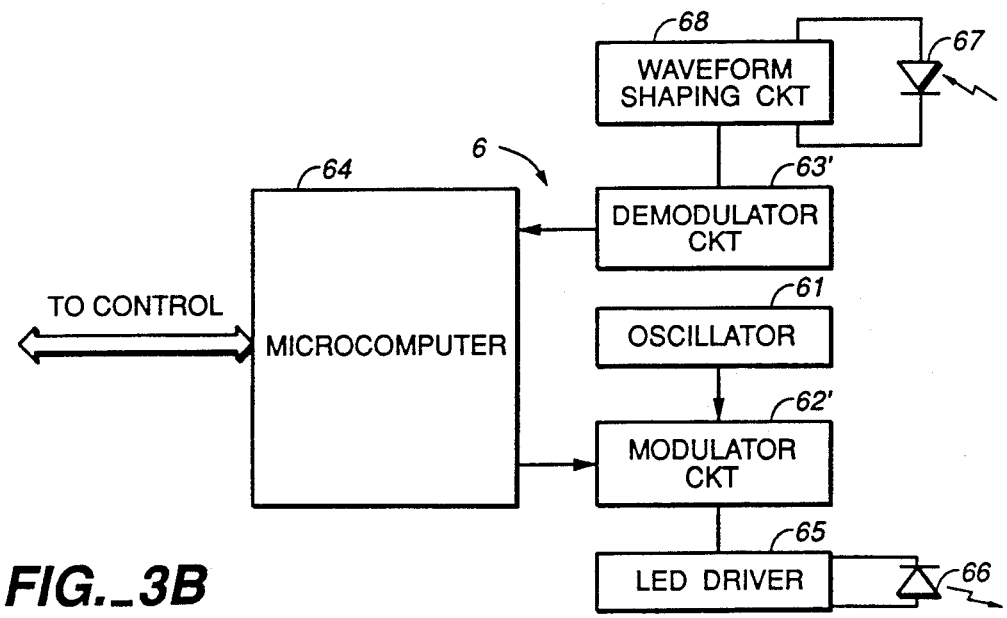
FIG._3B

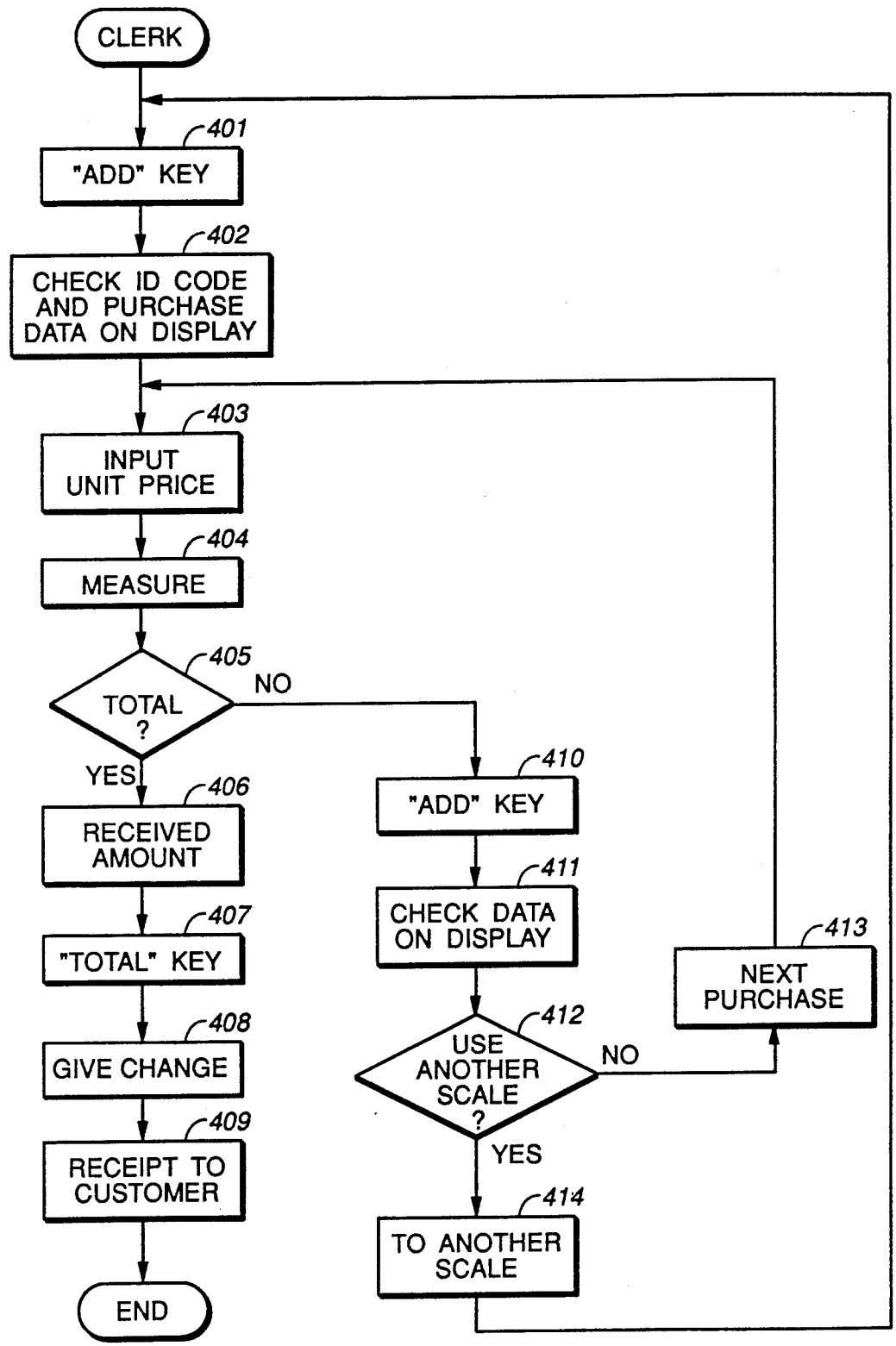
FIG._4

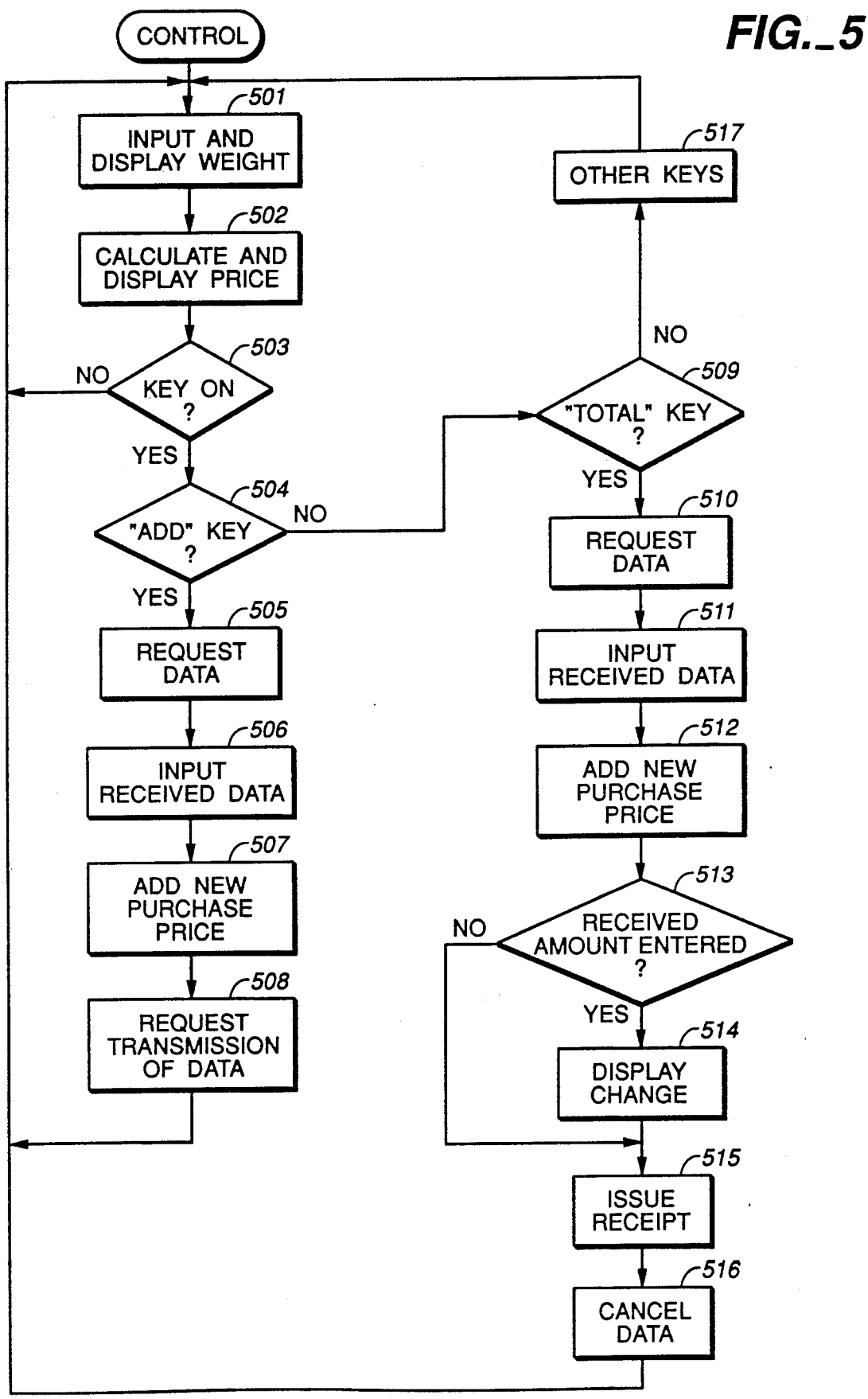
FIG._5

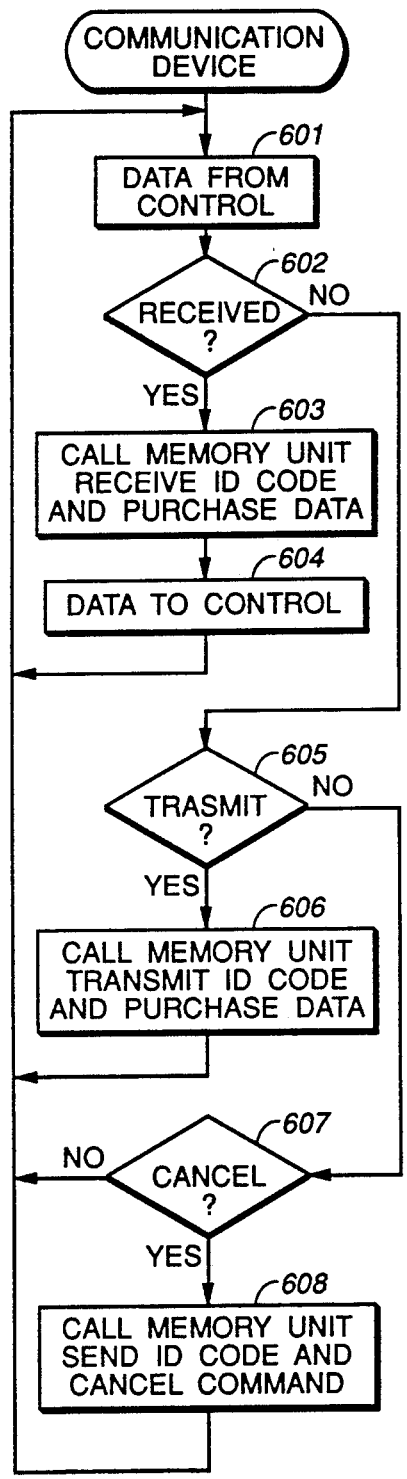
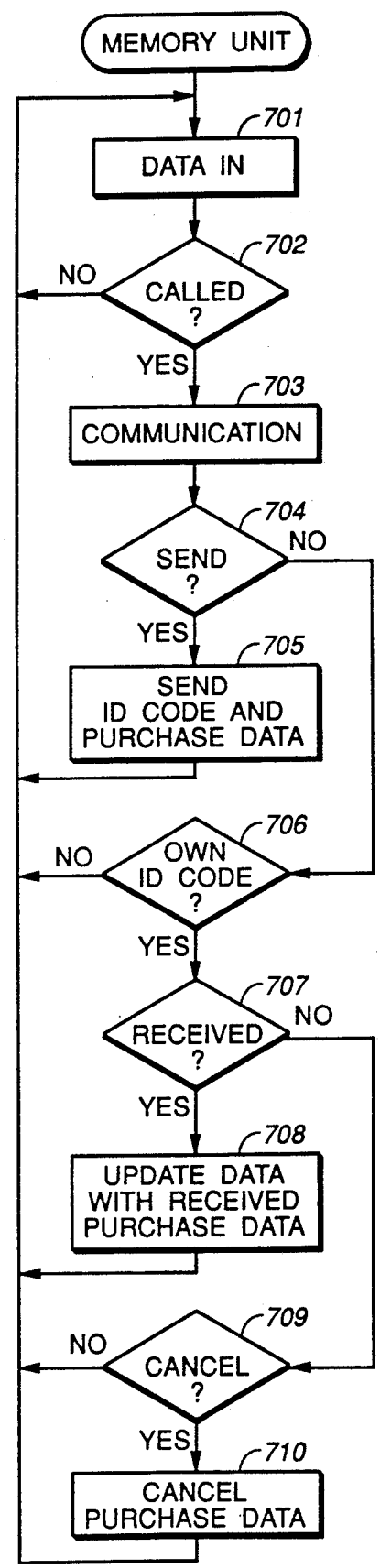
FIG._6
FIG._7

SALES DATA TRANSMISSION SYSTEM

BACKGROUND OF THE INVENTION

This invention relates to a network system for transmitting sales data including commercial scales capable of calculating purchase prices from measured weight data and unit prices or cash registers for registering and summing up purchase prices and a computer for carrying out production management, inventory management and customer management by analyzing purchase data, customer data and the like transmitted from such scales or cash registers.

Scales capable of calculating purchase prices from measured weight data and unit prices and of displaying them are commonly used at stores where meats and cooked foods are sold by their weights. Recently, there are stores having two or more of such scales connected together by communication cables such that a customer may make purchases from different scales but the data on his or her purchases are transmitted to all the scales in the store and the total purchase price can be calculated whenever the final purchase has been made and the customer is ready to pay. The technology of such a system of scales has been disclosed, for example, in Japanese Patent Publications Tokko 61-5606, 61-5607 and 61-18125.

Conventional systems as described above are inconvenient because communication cables must be provided and hence the scales which are connected to these cables cannot be moved around freely. Moreover, the cables can be quite unsightly since they must be extended to wherever the scales are disposed.

One of the methods of overcoming this problem has been to make use of wireless means for communicating data among the scales but this method has not been totally satisfactory from the point of view of reliability. Since the data to be communicated relate to purchase prices for the customers, the system must be able to transmit signals reliably.

Another method is to make use of a flexible memory-storing medium such as a magnetic card or an IC card for transmitting the sales data of customers from one scale to another. This method is superior to the one explained above from the point of view of reliability but the operation is disadvantageously troublesome because the card must be inserted into and removed from a reader-writer for each purchase data transmission. Where foods are handled, in particular, the user must be particularly careful in the handling of the card from the hygienical point of view.

SUMMARY OF THE INVENTION

It is therefore a general object of the present invention in view of the above to overcome the problems associated with the conventional systems for transmitting sales data by providing a highly reliable sales data transmission system which not only is capable of transmitting sales data generated by one scale to the others by means of a memory device that need not be inserted into and removed from a reader-writer but also enable its operator to check the data at each time of data transmission.

A sales data transmission system embodying the present invention, with which the above and other objects can be achieved, is characterized as being comprised of a sales data processor which calculates and displays sales prices, a communication device which is made a part of this data processor and transmits and receives signals indicative of sales data and a portable memory unit which serves not only to receive and store the sales data transmitted from the communication device but also to transmit, in response to a request, the stored sales data back to the communication device.

The aforementioned sales data processor includes a price-displaying scale capable of calculating the purchase price from a unit price and a measured weight value and displaying the same, or a cash register for registering and summing purchase prices. The memory unit is of a compact structure so as to be easily portable and includes a communication device, a microcomputer and a battery such that it can exchange data only with the communication device of the data processor.

Communication of data signals between the communication devices of the memory unit and the data processor is by an optical communication method using electromagnetic waves or infrared light. In order to avoid mixing of signals from communication devices belonging to a different data processing system, however, the system is generally designed such that the distance of communication is about 1 meter or less and that communication is possible only when the operator stands squarely in front of a target data processor with the memory unit carried on his coat.

With a sales data processing system as described above, each data item, which is generated by a sales data processor when a customer makes a purchase, is transmitted to and stored in the memory unit carried by an operator such as a store clerk. If the operator subsequently walks over to another sales data processor and operates it, the purchase data stored in the operator's memory unit are not only transmitted therefrom to the new data processor but are displayed on the data processor's display device such that the operator is able to check the transmitted data. In other words, the purchase data related to a purchase by a customer at one data processor are transmitted to another data processor in the store through the memory unit carried by the operator who moves along with the customer. If the customer makes another purchase at the second data processor, the newly generated purchase data are added to the old purchase data for that customer hitherto stored in the memory unit and transmitted again to the memory unit so as to be stored therein. In summary, the purchase data for each customer are exchanged among different data processors through the memory unit. When the operator finally operates a cash register, the purchase data of that customer are transmitted from the operator's memory unit to the cash register where a total sum to be paid by the customer is calculated.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings:

FIG. 1 is an external overall view of a sales data transmission system embodying the present invention;

FIG. 2 is a block diagram of the system of FIG. 1;

FIGS. 3(a) and 3(b) are block diagrams of the communication device of FIGS. 1 and 2 if the communication between the communication device and the memory unit is respectively by a frequency modulation method and by an optical communication method;

FIG. 4 is a flow chart of operations by a store clerk;

FIG. 5 is a flow chart of operations by the control device;

FIG. 6 is a flow chart of operations by the communication device;

FIG. 7 is a flow chart of operations by the memory unit; and

FIG. 8 is a portion of a flow chart to be inserted into the flow chart of FIG. 5 for operating the system in a different manner.

DETAILED DESCRIPTION OF A PREFERRED EMBODIMENT

In FIG. 1, there is shown a sales data transmission system embodying the present invention characterized as having a price-displaying scale (A) as its sales data processor with a weighing plate 1 and an input device 2 with a keyboard. On the keyboard of the input device 2, there are a ZERO key which is necessary for the measurement of a weight, a TARE key, numeric keys for inputting numerical data, an ADD key for adding the price of an additional purchase to the current total of the purchase prices, a TOTAL key for calculating the total price, a key for entering the amount received from a customer and a key for retrieving registered unit prices of individual items. Numeral 3 indicates a display device for displaying a unit price, a weight value, a calculated price, etc., numeral 4 indicates another display device for displaying communication data and operation messages related to the system operation, numeral 5 indicates a printer for printing purchase data on a receipt or a label, numeral 6 indicates a communication device containing a transceiver and letter M indicates a portable memory unit containing a transceiver which is identical to the one in the communication device 6. The memory unit M is designed such that it can be worn by an operator on the coat or the like.

With reference next to FIG. 2 which is a block diagram of the system shown in FIG. 1, the weighing plate 1 (not shown in FIG. 2) is connected to a load cell 7 which serves to convert a mechanical strain generated by a load thereon into an electrical signal. This weight-indicating electrical signal from the load cell 7 is received by a signal processing device 8 which includes amplifier, filter and digital-to-analog converter circuits and is outputted therefrom as a digital weight signal. Numeral 9 indicates a control device including a microcomputer and serves not only to receive the digital weight signal but also to control the operations of the input device 2, the display devices 3 and 4 and the printer 5. The operations of the control device 9, the communication device 6 and the memory unit M will be explained below.

If the communication between the scale A and the memory unit M takes place by frequency modulation (FM), the communication device 6 (and also a portion of the memory unit M) may be structured as shown by the block diagram of FIG. 3(a) wherein numeral 61 indicates an oscillator for generating a carrier wave, numeral 60 indicates an helical antenna designed to provide directionality to the carrier wave, numeral 62 indicates a modulator circuit for frequency-modulating the carrier wave by an output pulse (communication data) from the microcomputer 64 and numeral 63 indicates a demodulator circuit for demodulating a received modulated wave back into a pulse signal.

If an optical communication method is to be used between the scale A and the memory unit M, the communication device 6 (and also a portion of the memory unit M) may be structured as shown in FIG. 3(b) for the PPM (pulse position modulation) method of transmission such that the carrier wave outputted from the oscillator 61 is pulse-modulated in an modulator circuit 62' by an output pulse (communication data) from the microcomputer 64 and outputted to an LED (light emitting diode) driver 65. Numeral 66 indicates an infrared light emitting GaAs diode connected to the LED driver 65, numeral 67 indicates a photodiode which is sensitive to the infrared light transmitted from the infrared light emitting GaAs diode on the opposite side (the memory unit M), numeral 68 indicates a waveform shaping circuit for shaping received waves, and numeral 63' indicates a demodulator circuit for demodulating modulated waves, which have been received, back into pulse signals.

The memory unit M is operated by drawing power from an internal source such as a battery. In order to control the power consumption of the memory unit M, it is designed such that power is switched on and its microcomputer 64 is activated only when it is called from the communication device 6. If a cash register is incorporated in the system, its structure may be similar to that shown in FIG. 2 except there will be included a cash drawer instead of the weighing means such as the load cell 7 and the signal processing device 8.

Next, the routine of system operation by an operator such as a store clerk (CLERK) as well as the corresponding operations of the sales data processor (such as a price-displaying scale A) and the memory unit M will be explained with reference concurrently to the flow charts of FIGS. 4-7.

Before using the scale A, the clerk operates the ADD key on its input device 2 (Step 401) to check what information is then stored in the memory unit M carried by him or her. When this is done (YES in Step 504), the control device 9 performs Steps 504-508, causing Steps 601-604 and then Steps 601, 602, 605 and 606 to be carried out by the communication device 6 and Steps 701-705 and then Steps 701-704 and 706-708 by the memory unit M. More in detail, when this request is received (YES in Step 602), the communication device 6 calls and thereby activates the memory device M to obtain therefrom its ID code (assigned uniquely either to the memory device M itself or to the clerk who carries it) as well as the purchase data then stored therein (Step 603 from the point of view of the communication device 6 and Yes in Step 704 followed by Step 705 from the point of view of the memory unit M). These data obtained from the memory unit M are transmitted to the control device 9 (Step 604) which, upon receiving them, adds the newly calculated sales information to the data just received from the memory unit M through the communication device 6 and causes them to be displayed on the display device 3 (Step 507). The control device 9 also causes the communication device 6 to transmit these new data (Step 508) and the communication device 6, when this request is received from the control device 9 (Step 601, NO in Step 602 and YES in Step 605), again calls and thereby activates the memory unit M and transmits the ID code earlier received from the memory unit M and the purchase data from the control device 9 (Step 606). Upon thus being called and receiving these data (Step 701, YES in Step 702, Step 703 and NO in Step 704), the memory unit M ascertains that the received data include its own ID code (YES in Step 706) and the new sales information calculated by the control device 9 in Step 507 replaces the old sales data hitherto stored in the memory unit M (Step 708). When the clerk is beginning to use one of the scales for a new customer, however, the memory unit M normally contains zero as the total and the price calculated in Step 507 is also zero. Thus, the display device 4 of the scale A should show zero as the total purchase price.

After operating the ADD key in Step 401, the clerk checks the ID code and the total purchase price displayed on the display device 4 (Step 402). This has the favorable effect of improving the reliability of the data transmission and it should be noted that the clerk is thereby also checking the condition of the battery for the memory unit M.

When a customer makes an order to the clerk after the preparatory routine described above is completed, the clerk enters the unit price of the ordered item from the input device 2 (Step 403). The clerk then takes out the requested item and measures the required amount of the retrieved item (Step 404), causing the control device 9 to display the weight value (Step 501) and to calculate and display the price of the measured amount (Step 502). The aforementioned displays continue until there is a next key input (Step 503).

If the customer does not wish to purchase anything more and is ready to pay (YES in Step 405), the clerk operates the input device 2 to enter the amount received from the customer (Step 406) and operates the TOTAL key (Step 407, YES in Step 503, NO in Step 504 and YES in Step 509), causing the control device 9 to carry out Steps 510 to 516, the communication device 6 to carry out Steps 601-604, 602, 605, 607 and 608, and the memory unit M to carry out Steps 701-705. More in detail, the control device 9 causes the communication device 6 to request for data in Step 510 and the communication device 6 responds (Step 601) by carrying out Steps 602 and 603 as explained above to return the current purchase data to the control device 9 (Step 604). The control device 9, upon receiving this information (Step 511), adds it to the previous total to update the total purchase amount and causes it to be displayed on the display device 3 (Step 512) as explained above in connection with Steps 506-508. The control device 9 thereupon calculates the change to be returned by the clerk to the customer (Steps 513 and 514) and causes the printer 5 to print up the purchase and payment data to prepare a receipt (Step 515). Thereafter, a command to erase the purchase data is transmitted from the control device 9 (Step 516 and YES in Steps 607 and 709), causing the purchase data and the ID code to be erased from the memory unit M (Steps 608 and 710). In the situation described above as an example, however, the purchase data for the customer is not stored in the memory unit M and the result of addition in Step 512 is the same as the price calculated in Step 502. The clerk checks the amount of the change displayed on the display device 3 (Step 408) and gives the change, the purchased items and the receipt to the customer (Step 409).

If the customer has additional purchases to be made (NO in Step 405), the clerk does not operate the TOTAL key but operates the ADD key (Step 410). This causes the control device 9, the communication device 6 and the memory unit M to function similarly as explained above and the purchase data on the first purchase calculated in Step 507 are transmitted by the communication device 6 to the memory unit M and stored therein. These data are also displayed on the display device 2 and checked by the clerk (Step 411). If the customer moved on to another scale to buy another item (YES in Step 412 and Step 413), the clerk follows the customer and operates the ADD key on that scale (Step 401), causing this scale to carry out Steps 504-508 as explained above regarding the first scale. As a result, the ID code and the purchase data on the first purchase by this customer stored in the memory unit M are transmitted to this scale through its communication device 6 and displayed on its display device 4. The clerk checks this display (Step 402) and takes out the item desired by the customer, proceeding thereafter similarly as explained above.

If the customer need not move on to a different scale for the next purchase (NO in Step 412), the clerk takes out the next purchase item (Step 413) and carries out Steps 403 and 404 on the same scale, entering its unit price and measuring the required amount. This causes the control device 9 to repeat Steps 501 and 502, followed by Steps 504, 509 and 517, calculating and displaying the unit price, weight and purchase price of the selected item.

If the TOTAL key is operated thereafter, the control device 9 causes the purchase data on the first purchase stored in the memory unit M to be received through the communication device 6 (Step 511), adds thereto the purchase price of the second item calculated in Step 502 and displays the new total purchase price on the display device 3 (Step 512). After the purchase data on the first item are transmitted (Step 705), the memory unit M erases them (Step 710) in response to a command from the control device 9 (Step 516 and YES in Step 709). If the ADD key is operated instead of the TOTAL key, the control device 9 similarly causes the purchase data on the first purchase stored in the memory unit M to be received through the communication device 6 (Step 506), adds thereto the purchase price of the second item calculated in Step 502 and displays the new total purchase price on the display device 3 (Step 507). Thereafter, all the purchase data inclusive of the newly added data are caused to be transmitted together with the ID code to the memory unit M through the communication device 6 (Steps 508 and 606). In response, the memory unit M updates the stored information with the new purchase data (Step 708).

In summary, every time the ADD key is operated, the previously entered purchase data in the memory unit M are taken out to the scale A and the newly generated purchase information is added thereto, the result being sent back again to be stored in the memory unit M and transmitted also to the other scales in the same store where the customer makes purchases. The purchase data of each customer thus generated from different scales of the store are accumulated one after another in the memory unit M and, when a total is finally obtained at a cash register, the purchase data which have been accumulating for this customer are erased. The operations at the cash register are substantially the same as described above except Steps 501 and 502, which are characteristically required of the operation of a scale, are missing.

The foregoing description of a preferred embodiment of the invention has been presented for purposes of illustration and description. It is not intended to be exhaustive or to limit the invention to the precise form disclosed, and many modifications and variations are possible in light of the above teaching. For example, the scales and cash registers of the present invention may be designed so as to be operable only by a clerk carrying the memory unit M. This may be accomplished, for example, by inserting the steps shown in FIG. 8 before Step 503 of FIG. 5 such that the sales data processor A constantly keeps calling up the memory unit M (Step 801) and a key operation becomes possible (Step 804) only if a response is given from the memory unit M (YES in Step 802), the key operation remaining prohibited otherwise (NO in Step 802 and Step 803). Additional advantage of this embodiment of the present invention is that troubles in the memory unit M caused by the condition of its battery can be detected before its use is started such that the reliability of data transmission by the system can be further improved.

Moreover, a system according to the present invention can be so designed that only an authorized person such as the owner of the store can carry out some of its operations. For example, a system may be designed by making use of the ID code registered in the memory unit such that the registration of unit prices of sales items and the output of a cumulative sum can be carried out only if the control device recognizes the ID code of the store owner.

As another example, a time recorder or the like with a communication capability may be additionally provided such that the ID codes of individual clerks can be checked for the purpose of labor management. As still another example, the system may be so designed that the sales data from each data processor A are recorded in the memory unit M. The memory unit M is then taken to a host computer such that the sales data stored therein can be transmitted thereto.

Alternatively, a store may decide to ask the customers, instead of the clerks, to individually carry a memory unit M. In such a store, a memory unit M may be given to each customer at the entrance and collected at the time of calculating the total purchase price.

Any modifications and variations of the embodiments described above that may be apparent to a person skilled in the art are intended to be included within the scope of this invention. In summary, the systems of the present invention are highly reliable because they are based on one-to-one data exchanges between a data processor and a portable memory unit and are not unsightly at all because data communication is carried out by wireless means and hence no cables are required around the show cases or anywhere. Moreover, there is no need of pushing and pulling a magnetic card or the like into or out of a card reader. Since the purchase prices of individual purchased items are cumulatively added by signals being exchanged between the data processor and the memory unit, the operator has only to check the display to ascertain that data are being communicated normally.

What is claimed is:

1. A sales data transmission system comprising:
   a plurality of data processors for calculating and displaying a purchase price, each of said data processors having communication means for transmitting and receiving purchase data, and
   a wireless portable transceiver unit having memory means for storing data, said transceiver unit being capable of receiving and storing purchase data transmitted from and of transmitting purchase data stored in said memory means to one of said communication means within a communication range of said transceiver unit in response to a request signal from said one of said communication means.

2. The sales data transmission system of claim 1 wherein said data processors are scales capable of calculating a purchase price from a measured weight and a unit price and displaying said calculated purchase price.

3. The sales data transmission system of claim 1 wherein said data processors are cash registers.

4. The sales data transmission system of claim 1 wherein said communication means and said transceiver unit exchange said purchase data therebetween through wireless means.

5. The sales data transmission system of claim 1 wherein said transceiver unit exchanges data with said one of said communication means only in response to a signal from said one of said communication means.

6. The sales data transmission system of claim 1 wherein each of said data processors has a control device and an input device, said control device being so programmed as to cause a new purchase data item to be added to a total data item stored in said memory means of said transceiver unit in response to an add command received through said input means.

7. The sales data transmission system of claim 6 wherein each of said data processors has also an output device and said control device is also so programmed as to cause said total data item stored in said memory means of said transceiver unit to be outputted through said output device in response to a total command received through said input device.

8. The sales data transmission system of claim 1 wherein said portable transceiver unit is one of a plurality of similarly structured and functioning portable transceiver units, each of said transceiver units being assigned a different ID code and being activated only by a signal embodying said ID code.

9. A sales data transmission system comprising:
   a data processor for calculating and displaying a purchase price, said data processor having communication means for transmitting and receiving purchase data, and
   a wireless portable transceiver unit having memory means for storing data, said transceiver unit being capable of receiving and storing purchase data transmitted from and of transmitting purchase data stored in said memory means to said communication means if said communication means is within a communication range of said transceiver unit in response to a request signal received from said communication means.

10. The sales data transmission system of claim 9 wherein said transceiver unit exchanges data with said communication means only in response to a signal from said communication means.

11. The sales data transmission system of claim 9 wherein said data processor has a control device and an input device, said control device being so programmed as to cause a new purchase data item to be added to a total data item stored in said memory means of said transceiver unit in response to an add command received through said input device.

12. The sales data transmission system of claim 11 wherein said data processor has also an output device and said control device is also so programmed as to cause said total data item stored in said memory means of said transceiver unit to be outputted through said output device in response to a total command received through said input means.

13. The sales data transmission system of claim 9 wherein said portable transceiver unit is one of a plurality of similarly structured and functioning portable transceiver units, each of said transceiver units being assigned a different ID code and being activated only by a signal embodying said ID code.

* * * * *